(12) United States Patent
Beulich et al.

(10) Patent No.: US 7,357,464 B2
(45) Date of Patent: Apr. 15, 2008

(54) INTEGRAL BRAKING SYSTEM FOR MOTORCYCLES

(75) Inventors: Siegfried Beulich, Iffeldorf (DE); Hans-Albert Wagner, Munich (DE); Andreas Kirchberger, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/206,859

(22) Filed: Aug. 19, 2005

(65) Prior Publication Data

US 2006/0028064 A1 Feb. 9, 2006

Related U.S. Application Data

(63) Continuation of application No. PCT/EP2003/14477, filed on Dec. 18, 2003.

(30) Foreign Application Priority Data

Feb. 21, 2003 (DE) ................................. 103 07 339

(51) Int. Cl.
  *B60T 13/00* (2006.01)
(52) U.S. Cl. ...................... 303/9.64; 188/344; 188/349
(58) Field of Classification Search ................ 303/137, 303/9.64, 186, 122.04; 188/349, 106 P, 344
  See application file for complete search history.

(56) References Cited

U.S. PATENT DOCUMENTS

| | | | | |
|---|---|---|---|---|
| 5,620,237 A | * | 4/1997 | Iwashita et al. ........... 303/9.64 |
| 6,070,949 A | | 6/2000 | Hariu et al. | |
| 6,202,802 B1 | * | 3/2001 | Nakamura .................. 188/71.6 |
| 6,213,564 B1 | * | 4/2001 | Face, Jr. ......................... 303/3 |
| 6,234,588 B1 | * | 5/2001 | Sawada ................... 303/119.1 |
| 6,309,029 B1 | | 10/2001 | Wakabayashi et al. | |
| 6,369,581 B1 | * | 4/2002 | Ota et al. ................... 324/537 |
| 6,390,566 B1 | * | 5/2002 | Matsuno .................... 303/9.64 |
| 6,733,089 B1 | * | 5/2004 | Wakabayashi et al. ..... 303/9.64 |

FOREIGN PATENT DOCUMENTS

| | | |
|---|---|---|
| DE | 38 03 563 A1 | 8/1989 |
| DE | 199 49 807 A1 | 4/2000 |
| DE | 199 51 535 A1 | 5/2000 |
| DE | 100 11 375 A1 | 9/2000 |
| EP | 0 687 621 A2 | 12/1995 |
| EP | 1 277 635 A2 | 1/2003 |

* cited by examiner

*Primary Examiner*—Robert A. Siconolfi
*Assistant Examiner*—Mariano Sy
(74) *Attorney, Agent, or Firm*—Crowell & Moring LLP

(57) ABSTRACT

An integral brake system for motorcycles, in which a hydraulic brake system acts on one wheel is connected by a hydraulic line to a main brake cylinder which is controllable with a first brake lever, a brake system acts on the other wheel, with an actuator controllable by both the first brake lever and a second brake lever, and an electronic control unit that contains a regulating device for controlled distribution of the brake force between the two wheels. The electronic control unit is connected by electric control lines to a sensor that responds to operation of the hydraulic brake system, to the actuator and to the second brake lever. The control unit controls the actuator as a function of the output signal of the sensor or, in the event of operation of the second brake lever, to activate the brake system that acts on the second wheel.

9 Claims, 1 Drawing Sheet

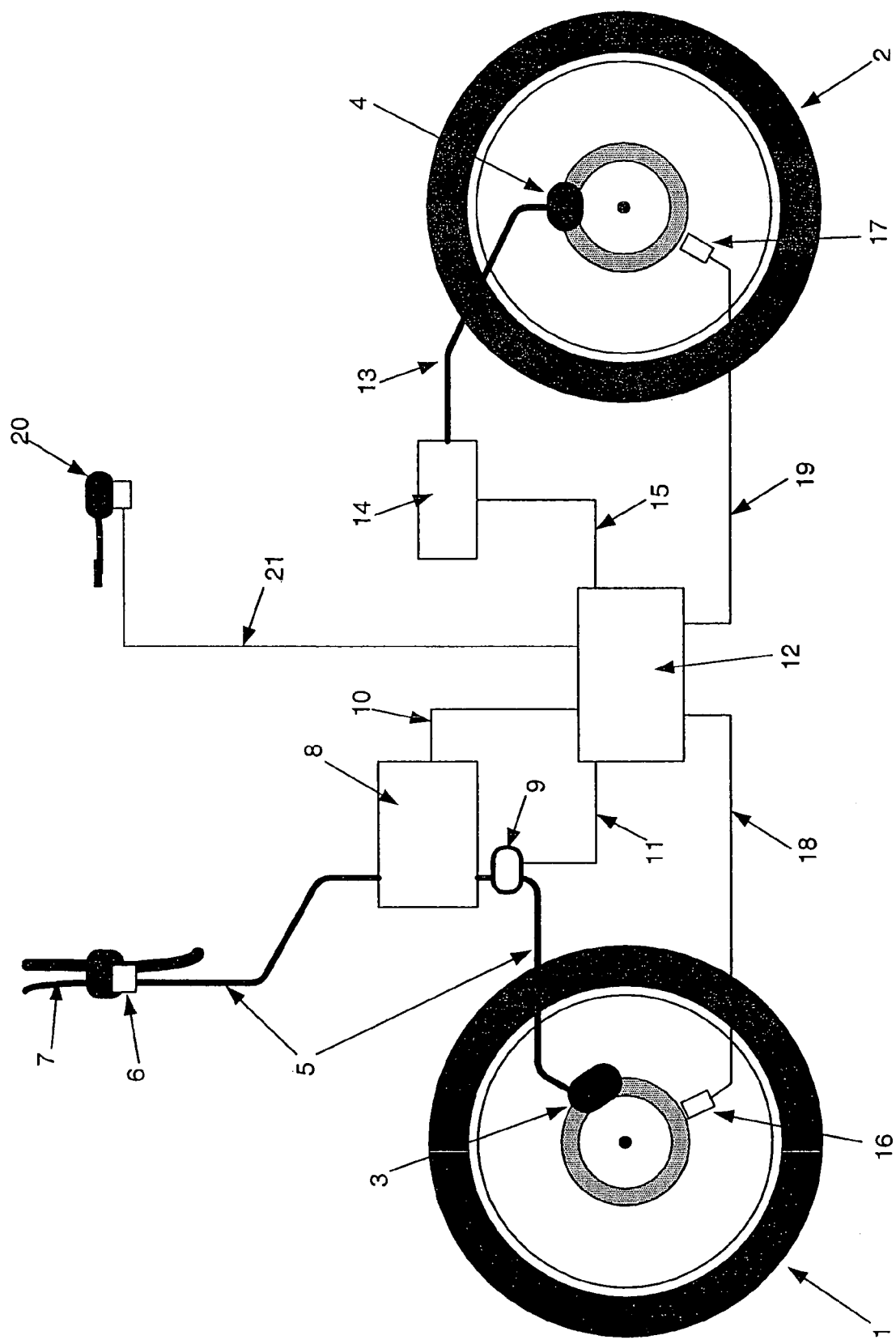

INTEGRAL BRAKING SYSTEM FOR MOTORCYCLES

This application is a continuation of International Patent Application No. PCT/EP2003/014477, filed Dec. 18, 2003, the entire disclosure of which is incorporated herein by reference. Priority is claimed based on German Patent Application No. 103 07 339.6, filed Feb. 21, 2003.

BACKGROUND AND SUMMARY OF THE INVENTION

This invention relates to an integral brake system for motorcycles, comprising a hydraulic brake system acting on one wheel and connected by a hydraulic line to a brake cylinder, which is controllable with a first brake lever, a brake system to which an actuator is assigned acting on the other wheel, said actuator being controllable by the first brake lever as well as a second brake lever, and a regulating device for controlled distribution of the brake force between the two wheels.

With a known integral brake system of this type, the brake system acting on the front wheel and the brake system acting on the rear wheel are both hydraulic. The actuator is assigned to the brake system acting on the rear wheel. The actuator comprises a main brake valve that is connected by separate hydraulic lines to the hand brake lever and the foot brake lever. This main brake cylinder contains a hydraulic control valve which forms the regulating device for controlled distribution of the brake force between the two wheels. With the known integral brake system, it is possible to operate the hydraulic brake system assigned to the rear wheel by using the foot brake lever alone or to operate the hydraulic brake system assigned to both the front wheel and the rear wheel jointly with the hand brake lever. In this case, the regulating system formed by the hydraulic control valve produces a controlled distribution of brake force between the two wheels. However, such a hydraulic regulating device which distributes the brake force to the front and rear wheels in a manner approximating the ideal dynamic brake distribution is extremely complex and expensive. In practice, it has been found that a seemingly ideal distribution of the dynamic brake force to the front and rear wheels cannot be achieved with a purely hydraulic control valve.

The object of this invention is to create a generic integral brake system for motorcycles which will permit an optimum distribution of the dynamic brake force between the front wheel and the rear wheel at a low manufacturing cost.

According to this invention, an integral brake system that conforms to these requirements is characterized by an electronic control unit that contains the regulating device and is connected by electric control lines to a sensor that responds to operation of the hydraulic brake system and to the actuator and the second brake lever, whereby the control unit controls the actuator as a function of the output signal of the sensor or in the case of operation of the second brake lever, to activate the brake system acting on the second wheel. In the case of the inventive integral brake system, the actuator replaces the main brake cylinder comprising the hydraulic control valve and a hydraulic control is dispensable.

The sensor that responds to operation of the hydraulic brake system may detect, for example, the actuation path of the first brake lever or the opposing force exerted on it. However, the sensor could also detect the deceleration of the motorcycle. A sensor that detects the pressure in the hydraulic line is particularly advantageous.

An anti-skid function may also be implemented on both wheels using the inventive integral brake system. To this end, an anti-skid sensor is provided for each of the two wheels; this sensor is connected to the control unit by control lines and a pressure reducing device upstream from the pressure sensor is provided in the hydraulic line and is connected by a control line to the control unit.

With the inventive integral brake system the brake system acting on the second wheel may be operating by both hydraulic and mechanical means. In the first alternative, the actuator is designed as a pump and is connected to the brake system by a hydraulic line. In the second alternative, the actuator is an electric motor actuator which is mechanically connected to the brake system. The integral brake system is preferably designed so that both the brake system assigned to the front wheel and the brake system assigned to the rear wheel can be operated with the hand brake lever whereas only the brake system assigned to the rear wheel can be operated with the foot brake lever.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration of an integral brake system in accordance with an embodiment of the present invention.

DETAILED DESCRIPTION

FIG. 1 shows the front wheel 1 and the rear wheel 2 of a motorcycle indicated schematically, a disk brake 3 and 4, respectively, being assigned to each. The brake system assigned to the front wheel 1 has a conventional design, i.e., the brake caliper of the disk brake 3 is connected by a hydraulic line 5 to a main brake cylinder 6 which can be controlled with a hand brake lever 7. A pressure reducing device 8 is provided in the hydraulic line 5 and a pressure sensor 9 is arranged between the pressure reducing device and the disk brake 3. The pressure reducing device 8 and the pressure sensor 9 are connected to an electronic control unit 12 by electric control lines 10 and 11. The disk brake 4 assigned to the rear wheel 2 of the motorcycle (not shown in detail) is connected by a hydraulic line 13 to an actuator 14 formed by an electric pump. The actuator 14 is connected to the control unit 12 by an electric control line 15. Anti-skid sensors 16 and 17 are assigned to the front wheel 1 and the rear wheel 2, respectively, these anti-skid sensors being connected by an electric control line 18 or 19 to the control unit 12. A foot brake lever 20 of the motorcycle is connected to the control unit 12 by an electric control line 21.

The control unit 12 is programmed so that it fulfills a double function for optimum distribution of the brake force to the front and rear wheels and to reduce the brake force in skidding of a wheel.

The integral brake having the design described above is explained in greater detail below.

When the hand brake lever 7 of the motorcycle is operated, a brake pressure is built up in the hydraulic line 5 in the conventional way so that the disk brake 3 assigned to the front wheel 1 is operated. The increase in pressure in the hydraulic line 5 is detected by the pressure sensor 9, which sends a corresponding signal via the control line 11 to the control unit 12. The control unit 12 determines on the basis of this signal the ideal braking force for the rear wheel 2 and sends a corresponding signal over the control line 15 to the actuator 14. The actuator 14 and/or the electric pump then generate(s) the brake pressure required to activate the rear disk brake 4 in the hydraulic line 13. Thus, by operating the hand brake lever 7, the front and rear disk brakes 3 and 4 can be operated jointly, with the electronic control unit 12 ensuring an optimum distribution of the applied brake force to the front and rear wheels.

When the foot brake lever 20 is operated, then the control unit 12 receives a brake signal over the control line 21 and the actuator 14 is triggered by the control unit 12 via the control line 15 to generate the corresponding brake pressure in the hydraulic line 13. It is therefore possible to brake only the rear brake 2 by operating the foot brake lever 20.

If the front wheel 1 skids in a braking operation, then the anti-skid sensor 16 sends a corresponding signal to the control unit 12. The control unit 12 controls the pressure-reducing device 8 via the control line 10 so that the brake pressure in the hydraulic line 5 is reduced to reduce the braking action of the front disk brake 3. This pressure drop in the hydraulic line 5 is recorded by the pressure sensor 9 which sends a corresponding signal to the control unit 12. The control unit 12 then determines the proper reduced pressure in the hydraulic line 13 for the reduced pressure in the hydraulic line 5 and sends a corresponding control signal to the actuator 14. In this way, skidding of the front wheel 1 can be prevented while at the same time the dynamic brake force distribution regarded as ideal between the front and rear wheels can be retrained.

If the rear wheel tends to skid, then the brake force regulating procedure described above proceeds in the opposite order.

If braking is performed with the rear disk brake 4 by operating only the foot brake lever 20, then the control unit 12 triggers only the actuator 14 to reduce the brake pressure in the hydraulic line 13 in the required manner.

It can be seen here that in the event of failure of the system comprising the sensor 9, the control unit 12 and the actuator 14, the functionality of the hydraulic brake system 3 assigned to the front wheel is retained.

In deviation from the exemplary embodiment depicted here, the actuator 14 could also be formed by an electric brake cylinder. However, the actuator 14 could also be an electric motor actuator that is mechanically connected to the rear disk brake 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NOTATION

1 Front wheel
2 Rear wheel
3 Disk brake of 1
4 Disk brake of 2
5 Hydraulic line of 3
6 Main brake cylinder
7 Hand brake lever
8 Pressure-reducing device
9 Pressure sensor
10 Control line of 8
11 Control line of 9
12 Control unit
13 Hydraulic line of 4
14 Actuator
15 Control line of 14
16 Anti-skid sensor of 1
17 Anti-skid sensor of 2
18 Control line of 16
19 Control line of 17
20 Foot brake lever
21 Control line of 20

What is claimed is:

1. Integral brake system for motorcycles, comprising a hydraulic brake that acts on a first wheel and is connected by a hydraulic line to a main brake cylinder which is controllable with a first brake lever, a brake system acting on a second wheel to which an actuator is assigned that is controllable with both the first brake lever and a second brake lever, said second brake lever not connected by a hydraulic line to the second wheel brake system, and a regulating device hydraulically connected to the first wheel brake system for varying distribution of brake force between the two wheels to obtain an ideal brake force distribution, wherein an electronic control unit is in communication with the regulating device and is electrically connected to a sensor that responds to operation of the hydraulic brake, to the actuator and to the second brake lever, wherein the control unit triggers the actuator as a function of the output signal of the sensor or actuation of the second brake lever to activate the brake system acting on the second wheel, and controls the distribution of brake force between the first wheel and the second wheel to obtain the ideal brake force distribution by changing brake force generated at the second wheel in response to changes in brake force generated at the first wheel.

2. Integral brake system as claimed in claim 1, wherein the sensor responds to the pressure in the hydraulic line.

3. Integral brake system as claimed in claim 2, wherein the sensor is a pressure sensor, an anti-skid sensor is provided for each of the two wheels and is electrically connected to the electronic control unit, and a pressure-reducing device is arranged in the hydraulic line upstream from the pressure sensor and is electrically connected to the control unit.

4. Integral brake system as claimed in claim 2, wherein the actuator is a pump or an electric brake cylinder and is connected by a hydraulic line to the brake system which acts on the second wheel.

5. Integral brake system as claimed in claim 3, wherein the actuator is a pump or an electric brake cylinder and is connected by a hydraulic line to the brake system which acts on the second wheel.

6. Integral brake system as claimed in claim 2, wherein the actuator is an electric motor actuator that is mechanically connected to the brake system acting on the second wheel.

7. Integral brake system as claimed in claim 3, wherein the actuator is an electric motor actuator that is mechanically connected to the brake system acting on the second wheel.

8. Integral brake system as claimed in claim 1, wherein the first wheel is the front wheel and the second wheel is the rear wheel.

9. Integral brake system as claimed in claim 1, wherein in the event of failure of at least one of the sensor, the electronic control unit, and the actuator, the functionality of the hydraulic brake system is retained.

* * * * *